United States Patent [19]

Saito

[11] Patent Number: 5,781,851

[45] Date of Patent: Jul. 14, 1998

[54] HETERODYNE RECEIVER

[75] Inventor: Masahisa Saito, Yokohama, Japan

[73] Assignee: Kabushiki Kaisha Toshiba, Kawasaki, Japan

[21] Appl. No.: 545,197

[22] Filed: Oct. 19, 1995

[30] Foreign Application Priority Data

Oct. 20, 1994 [JP] Japan ................... 6-255320

[51] Int. Cl.$^6$ ................... H04B 1/18
[52] U.S. Cl. ................... 455/182.1; 455/184.1; 455/192.1
[58] Field of Search ................... 455/180.1, 182.1, 455/184.1, 185.1, 188.1, 192.1, 196.1, 208, 214, 260, 263, 264, 266, 307, 337, 339, 340

[56] References Cited

U.S. PATENT DOCUMENTS 5,027,431  6/1991  Tanaka et al. ................... 455/214
5,263,187  11/1993  Sugawa et al. ................... 455/340

FOREIGN PATENT DOCUMENTS 5-7166  1/1993  Japan.

*Primary Examiner*—Reinhard J. Eisenzopf
*Assistant Examiner*—Marsha D. Banks-Harold
*Attorney, Agent, or Firm*—Finnegan, Henderson, Farabow, Garrett & Dunner, L.L.P.

[57] ABSTRACT

A heterodyne receiver of the present invention is of a heterodyne system including a voltage controlled circuit and a phase locked loop circuit. The receiver further includes a tuned voltage signal compensating circuit adapted to deliver a frequency passband compensating signal to a bandpass filter on the basis of a variation of an output signal obtained as a result of comparison made between a tuned voltage signal from the phase locked loop circuit and a detected signal from a detector. The heterodyne circuit can obtain a stable nearby frequency selectivity characteristic even in the case where there arises a temperature variation in the receiver.

4 Claims, 5 Drawing Sheets

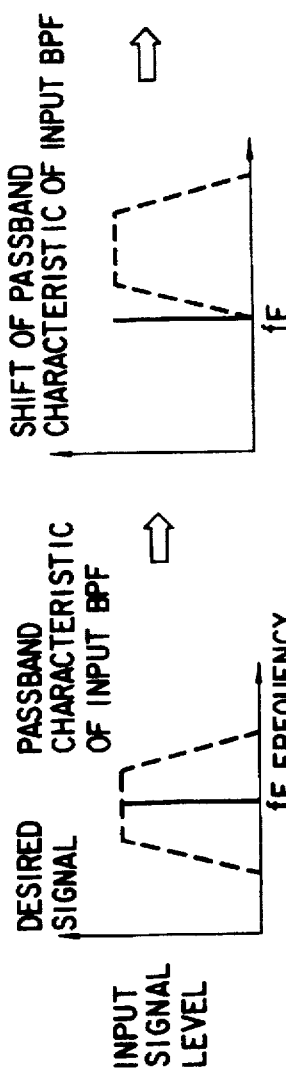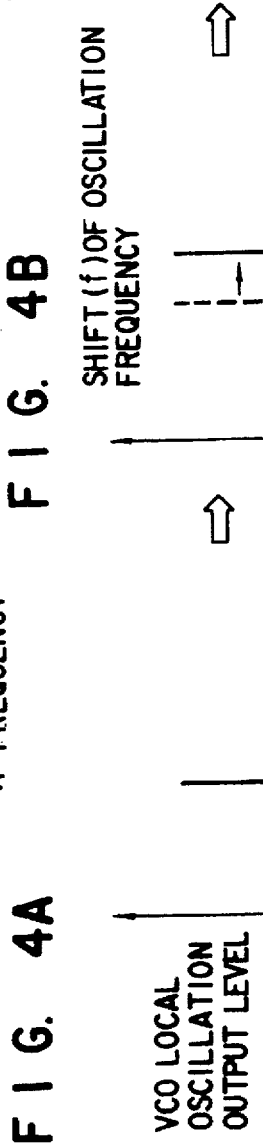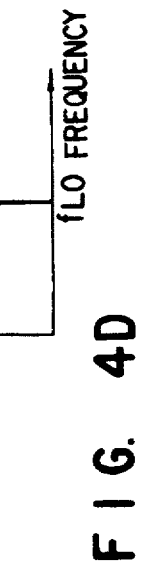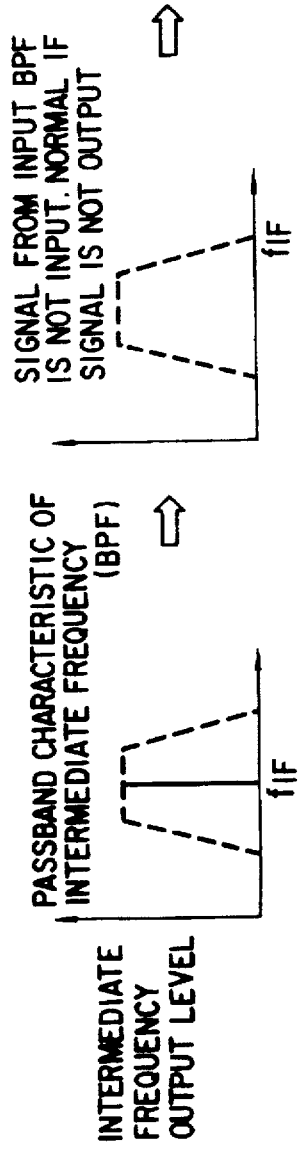

HETERODYNE RECEIVER

BACKGROUND OF THE INVENTION

1. Field of the Invention

The present invention relates to a heterodyne receiver for improving the selectivity characteristic of a nearby frequency.

2. Description of the Related Art

FIG. 5 shows a circuit arrangement of a normal heterodyne receiver.

In the circuit shown in FIG. 5, in order to achieve performance improvement in the selectivity of image-pickup frequency and nearby frequency, a BPF (bandpass filter) 4 is provided at a preceding stage of a high frequency amplifier 1 for amplifying an input signal and a BPF (bandpass filter) 5 is provided at a subsequent stage of an inter- mediate frequency amplifier 3 for amplifying an input signal containing a intermediate frequency.

A PLL (Phase Locked Loop) circuit 7 generates a tuned voltage on the basis of a predetermined reference frequency from a frequency selection circuit 8. The oscillation frequency of a VCO (Voltage Controlled Oscillator) circuit 6 is controlled by the tuned voltage.

The frequency passband of the BPF 4 is controlled using, as a frequency passband compensating signal, the tuned voltage coming from the PLL circuit 7.

In such a conventional circuit arrangement, if a temperature (an ambient temperature) varies in the receiver, the tuned voltage signal compensated via the PLL circuit 7 is applied to the VCO circuit 6 to obtain a normal oscillation frequency.

The tuned voltage signal temperature (ambient)-compensated via the PLL circuit, not a tuned voltage based on an output value of a detector, is applied to a tuned voltage signal instructed to the BPF 4.

For this reason, there is sometimes a risk that the frequency passband of the BPF 4 will vary due to a variation caused by an unnecessary tuning voltage and that the frequency passband will be deviated relative to an input signal.

A countermeasure has been conceived against such an event by, as shown in FIG. 7, initially taking up a broader passband of the BPF with respect to an input signal shown in FIG. 6 so as to allow a desired signal to be passed even if a tuned voltage signal compensated is applied.

In this state, however, in addition to the nonlinear component of active elements, there also occurs a spurious component, as an intermediate frequency component, as shown in FIG. 8 due to an interference from the input signal, thus leading to a decline in S/N ratio as well as to a fall in output level resulting from the diffusion of energy.

Further, in order to improve the distortion characteristic in this state, it is necessary that an intercept point be made high as shown in FIG. 9. This leads to an increase in dissipation power.

One solution is to build a circuit of such a type as to have the generation frequency of the VCO circuit 6 suffer as low a temperature variation as possible. For example, a capacitor is added to the VCO circuit so as to suppress an output variation against a temperature variation, but this has not thus far been to an adequate extent.

In Jpn. Pat. Appln. KOKAI Publication No. 5-7166, a proposal has been made according to which a proper tuned voltage is generated by detecting a variation in ambient temperature (in particular, a temperature in a frequency selection circuit and BPF) by means of a temperature detection section and correcting the oscillation frequency of a frequency selection circuit on the basis of such a detection.

In this proposal, a temperature detection sensor and temperature correction section are provided in which case no PLL circuit is employed. This leads to a complex circuit arrangement. It is also necessary to conceive the idea of enabling the temperature detection sensor to accurately detect the ambient temperature as well as of providing a space. An apparatus thus obtained becomes complex in arrangement and bulkier in size.

SUMMARY OF THE INVENTION

It is accordingly the object of the present invention to provide a heterodyne receiver which can obtain a nearby frequency selectivity characteristic even if there arises an ambient temperature variation.

In order to achieve the above-mentioned object, there is provided a heterodyne receiver comprising:

a bandpass filter provided at a preceding stage of a frequency mixer and allowing passage of an input signal at a predetermined frequency band;

a voltage controlled oscillator for sending a predetermined local oscillation frequency signal to the frequency mixer;

a phase locked loop circuit for outputting, to the voltage controlled oscillator circuit, a tuned voltage signal for controlling the oscillation frequency of the voltage controlled oscillator circuit; and a detector for detecting a predetermined signal from a signal which is mixed by the frequency mixer, amplified and intermediate-frequency-removed and for delivering a detected signal as an output signal, the heterodyne receiver further comprising compensating signal generating means for compensating the tuned voltage signal on the basis of the detected signal delivered from the detector and maintaining the predetermined frequency band of the bandpass filter at all times.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 4A to 4C show a frequency passband of the BPF in the receiver of FIG. 1 and a compensated state of a desired frequency.

FIGS. 4D to 4F show a compensated shift of a desired frequency by a PLL circuit, and FIGS. 4G to 4I show a frequency passband of the BPF in the receiver of FIG. 1 and a compensated state of a desired frequency;

DETAILED DESCRIPTION OF THE PREFERRED EMBODIMENT

The embodiment of the present invention will be explained below in more detail with reference to the accompanying drawings.

Figure 1:
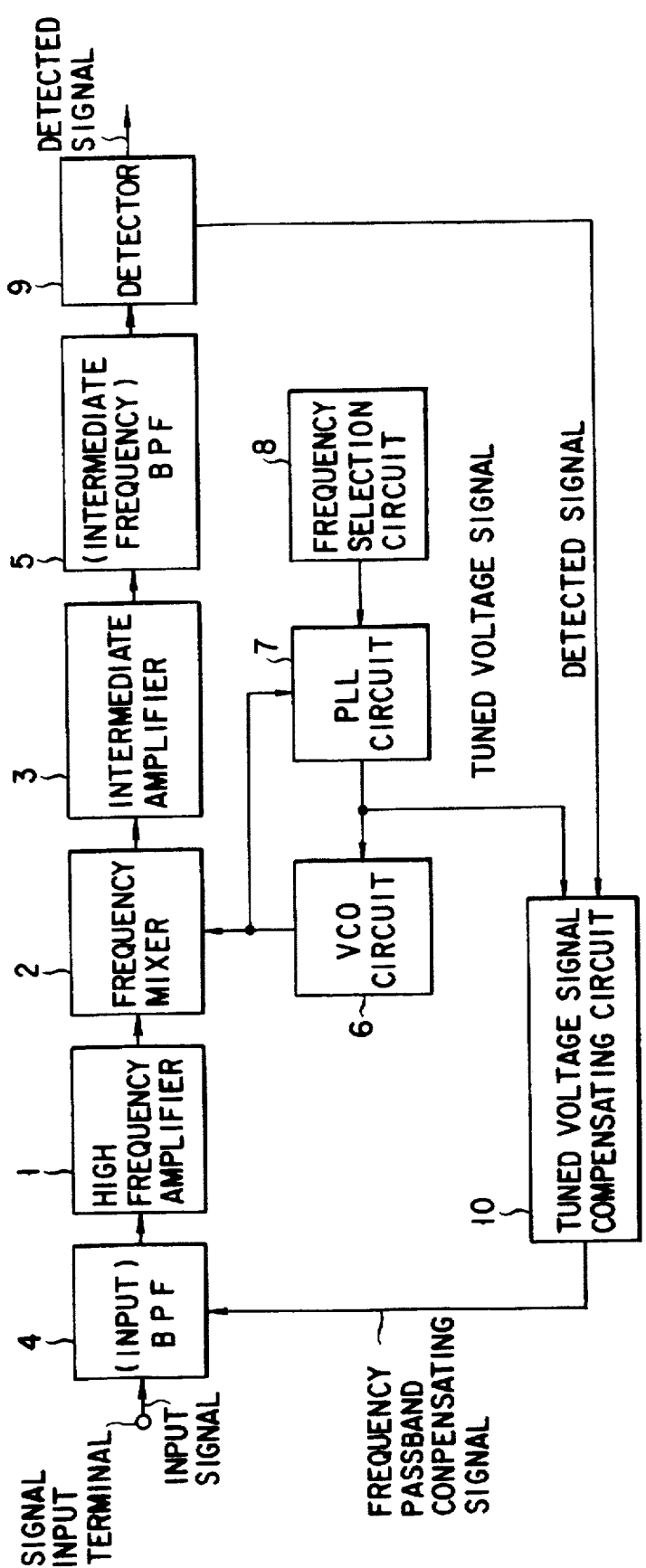
FIG. 1 is a schematic diagram showing a heterodyne receiver according to an embodiment of the present invention.

FIG. 1 shows an arrangement of a heterodyne receiver of the present invention.

The major section of the receiver is of such a heterodyne system as to include a VCO circuit and PLL circuit.

In addition to this, the feature of the present invention lies in a tuned voltage signal compensating circuit 10 adapted to compare a tuned voltage signal coming from the PLL circuit 7 with a detected signal delivered as an output signal from a detector 9, to compensate the tuned voltage signal on the basis of a variation in a detected output signal and to deliver a frequency bandpass compensating signal to a BPF 4. The frequency passband of the BPF 4 is controlled by the frequency passband compensated signal which is input to the BPF 4.

As set out in conjunction with the prior art problem, the tuned voltage value which is output from the PLL circuit 7 to the VCO circuit 6 varies due to a variation in temperature (ambient temperature) in the receiver, a power supply drift, and other causes. The feature of the present invention lies in that the BPF 4 is not controlled by the tuned voltage value compensated.

Figure 2:
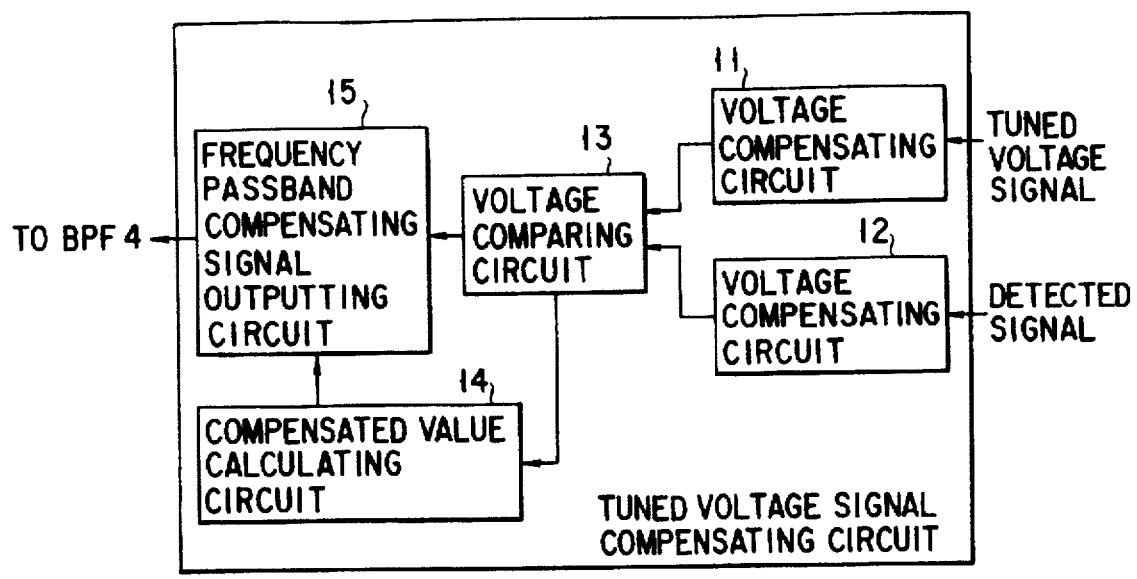
FIG. 2 is a schematic diagram showing a tuned voltage signal compensating circuit in a schematic diagram in FIG. 1.

The tuned voltage signal compensating circuit 10 comprises, as shown in FIG. 2, voltage compensating circuits 11 and 12 respectively compensating the tuned voltage signal from the PLL circuit 7 and a detected signal from the detector, a voltage comparing circuit 13 for comparing the voltages of those signals compensated to the same levels, a compensated value calculating circuit 14 for calculating a compensated value for producing, from a compared value, a frequency passband compensating signal to be output to the BPF 4, and a frequency passband compensating signal outputting circuit 15 for applying, to the BPF 4, an output voltage compensated by the calculated value.

If, for example, a second converter in a BS tuner is involved, the tuned voltage signal (VT voltage input signal) of about 2 to 25 V is input to the voltage compensating circuit 11 while, on the other hand, the detected signal from the detector is applied to the voltage compensating circuit 12 noting that the detected signal is of a very small voltage of a few tenths of mV to a few hundreds of mV. As appreciated from the above, these circuits 11 and 12 allow a comparison to be made by the subsequent-stage voltage comparing circuit 13 and adequate precision to be ensured.

The compensated value calculating circuit 14 is adapted to enable the calculation, based on the value from the voltage comparing circuit 13, of the frequency passband compensating signal outputting circuit 15 to be applied to the BPF 4. The frequency passband compensating signal may be composed of, for example, a signal based on a voltage value. This calculating method is used to derive out an accurate compensated value by initially setting functions based on actual measurement, etc., and calculating at all times those values sequentially input from the voltage comparing circuit 13. This compensation is made in a loop route based on the detected signal fed back from the detector 9.

Although the compensated value calculating circuit 14 has been explained as being calculated based on the initially set functions, it may be possible to prepare values of a frequency passband compensating signal as a table by finding, based on actual measurement, a relation between results of comparison by the voltage comparing circuit 13 and the frequency passband compensating signal to be applied to the BPF 4 and enabling compensation to be made in accordance with the result of the comparison.

The tuned voltage signal compensating circuit 10 ensures a frequency band through which only a desired signal passes at all times, this being achieved by the frequency bandpass compensation made relative to the BPF 4 as shown in FIGS. 4A to 4I by feeding back the tuned voltage value varying due to a variation in ambient temperature and the detected signal from the detector and making their comparison.

Figure 3:
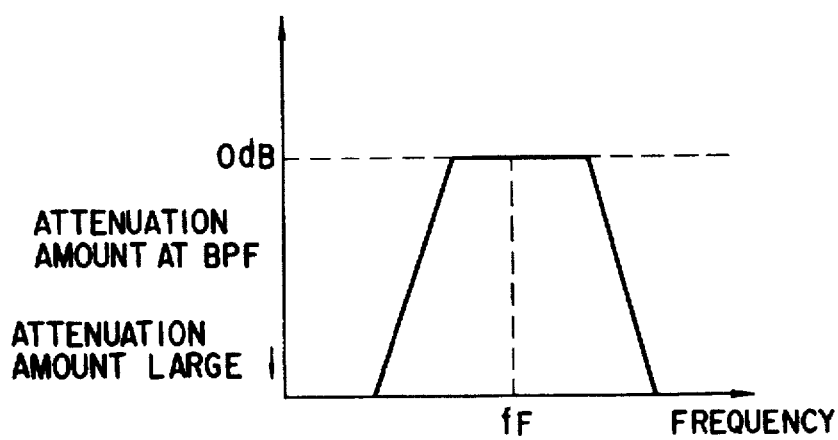
FIG. 3 is a view showing a relation between a frequency passband of a BPF in the receiver and a desired frequency.
Figure 6:
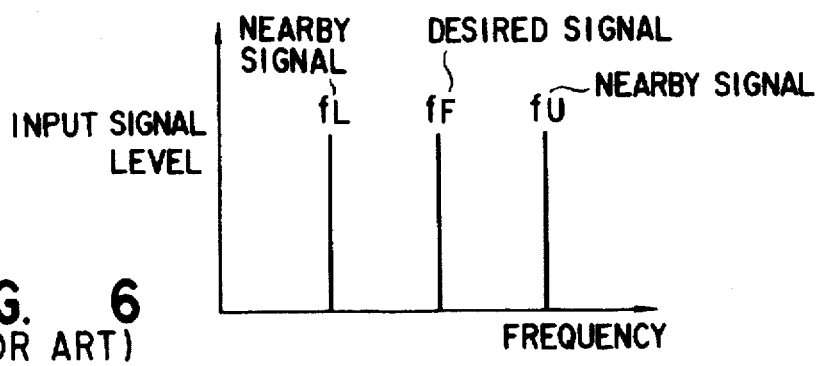
FIG. 6 is a view showing examples of input signals of the conventional heterodyne receiver.
Figure 5:
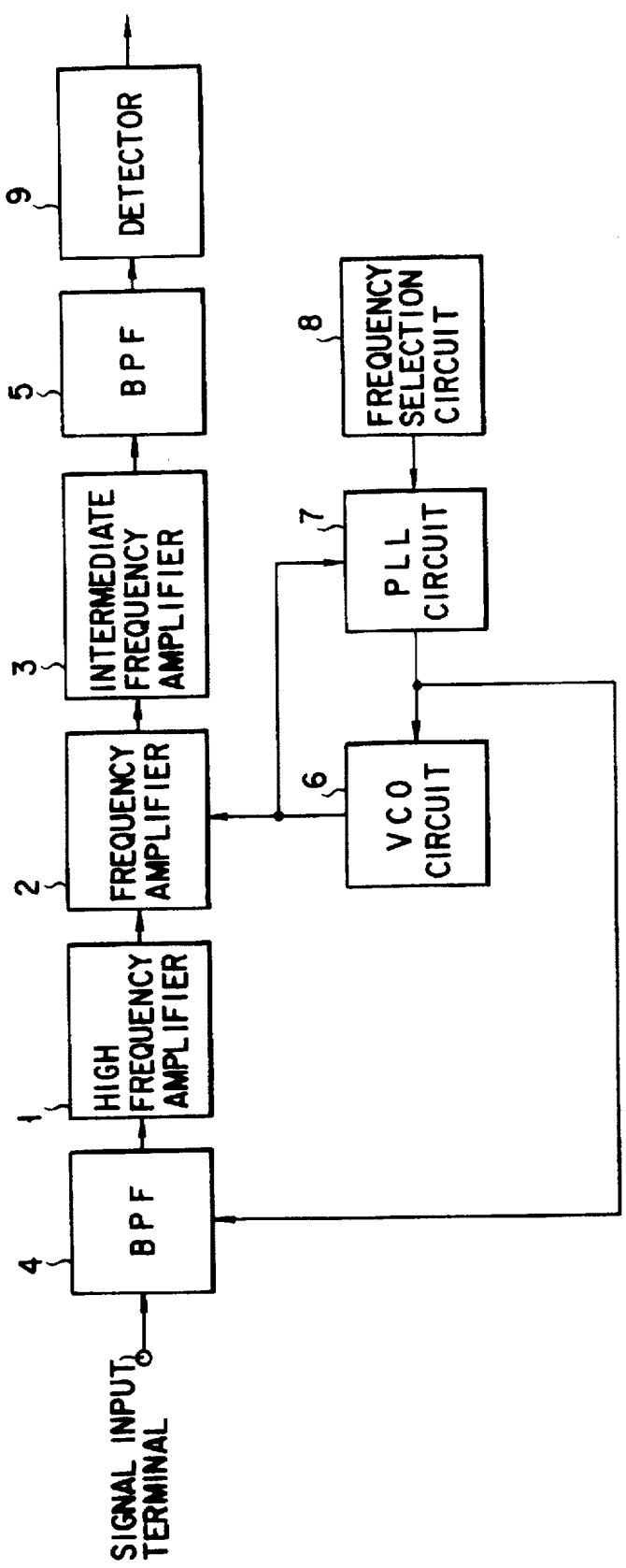
FIG. 5 is a schematic diagram showing a conventional heterodyne receiver.
Figure 7:
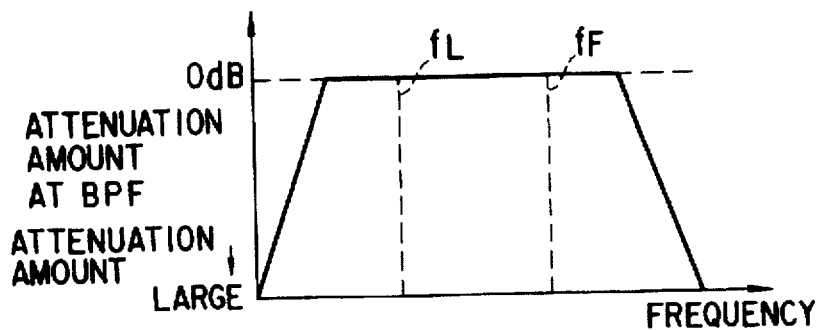
FIG. 7 is a view showing a passband characteristic of a BPF of the conventional heterodyne circuit.
Figure 8:
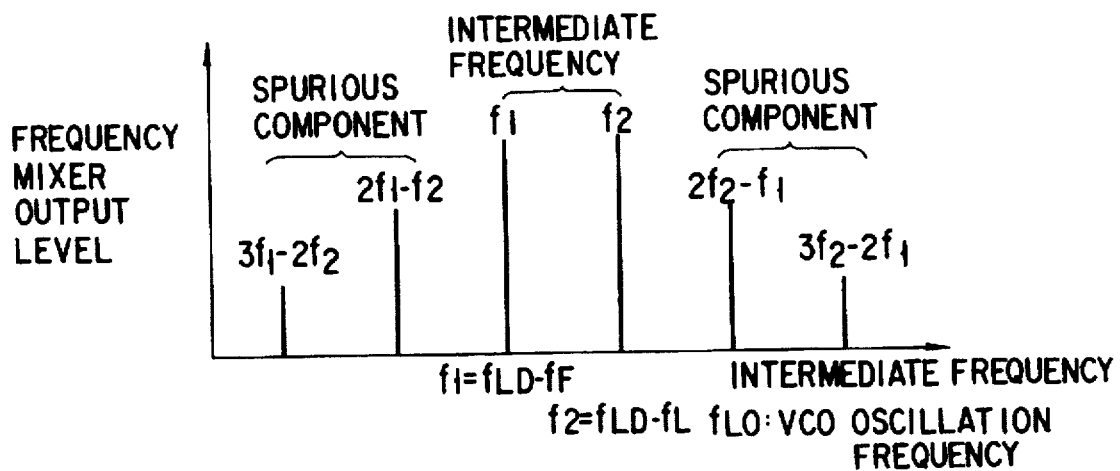
FIG. 8 is a view showing an output state of a frequency mixer in the conventional heterodyne receiver.
Figure 9:
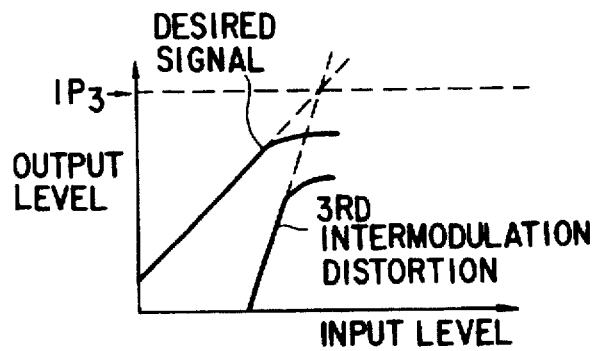
FIG. 9 is a view showing an input/output level relation of the conventional heterodyne receiver.

As seen from FIG. 3, the use of such a feedback enables the present receiver to fully utilize a narrower frequency passband of the BPF than the conventional counterpart.

At a basic operation, the characteristic of an input signal is such that, as seen from FIGS. 4A to 4C, a signal $f_F$ of a desired frequency is within the frequency passband of the BPF indicated by the broken lines. In the actual operation, there are sometimes the cases that, due to a variation in ambient temperature, a power supply drift and other causes, the frequency passband of the BPF is so shifted that, as shown in FIG. 4B, a signal of a desired frequency $f_F$ goes out of the frequency band of the BPF. By providing the tuned voltage signal compensating circuit 10 in the receiver of the present invention it is possible to prevent the shifting of the BPF's frequency passband.

Even if a local oscillation frequency from the VCO circuit is deviated by an amount f, as shown in FIGS. 4D to 4F, it is compensated by the PLL circuit to a normal oscillation frequency to obtain a desired frequency signal $f_{LO}$. Viewed even from an output level in the frequency passband of an intermediate frequency BPF, it is found from FIGS. 4G to 4I that, even when an input signal from the BPF 4 goes out of the frequency passband and no normal IF signal is output as shown in FIG. 4H, a desired frequency signal $f_{IF}$ can be obtained through the compensation of the frequency signal $f_{IF}$.

Further, the frequency variation of the VCO circuit section, being within a tracing action range of the PLL circuit section, presents no specific problem at all. It is, therefore, possible to achieve the integration of the VCO as well as a system IC version of the VCO and BPF circuit sections.

The present invention can be applied not only to the heterodyne system but also to all those receivers for converting a high-frequency signal to an audio-frequency, etc., signal with the use of a local oscillation circuit and can also readily be applied to, for example, a straight-, a superheterodyne-, a direct conversion- (homodyne-), etc., system.

As set out above, the tuned voltage signal compensating circuit is provided whereby tuned voltage signal is compensated based on a detector's output fed back to the heterodyne receiver. By doing so, compensation can be made for an ambient temperature variation, a power supply drift and other causes. It is, therefore, possible to realize a narrowed BPF through which only a desired signal can be passed.

Thus, it is possible to largely improve the distortion characteristic (primarily, a third-order intermodulation distortion characteristic). It is also possible to lower a third-order intercept point (IP3) of a heterodyne-structured circuit as compared to the conventional counterpart and hence to reduce the dissipation power when the system is structured. That is, a lower dissipation power type heterodyne receiver can be structured than the conventional counterpart.

Further, the frequency variation of the VCO circuit section, being within a tracing action range, presents no specific problem. The integration of the VCO circuit section as well as the structuring of the BPF circuit into a system IC can be achieved, thus realizing a decrease in number of component parts involved, a decline in cost and in a low dissipation power.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A heterodyne receiver comprising:

a bandpass filter, provided at a preceding stage of a frequency mixer, for permitting passage of an input signal at a predetermined frequency passband;

a voltage controlled oscillator circuit for outputting a predetermined local oscillation frequency signal to the frequency mixer;

a phase locked loop circuit for outputting a tuned voltage signal for controlling the oscillation frequency of the voltage controlled oscillator circuit;

a detector for detecting a predetermined signal from a frequency-mixed, amplified, and intermediate-frequency-removed signal and for outputting the detected predetermined signal as an output signal; and compensating signal generating means for compensating the tuned voltage signal based on said detected predetermined signal and for maintaining the predetermined frequency passband of the bandpass filter, wherein said compensating signal generating means includes, voltage compensating means for compensating the tuned voltage signal and the detected predetermined signal to the same levels;

voltage comparing means for generating a compared voltage value based on comparing voltages of the compensated tuned voltage signal and the compensated detected predetermined signal;

compensated value calculating means for calculating a compensated voltage value based on the compared voltage value; and compensating voltage outputting means for outputting, to the bandpass filter, a frequency passband control signal, compensated by the calculated compensated voltage value, so as to maintain the predetermined frequency passband, wherein variations in the frequency passband control signal, due to receiver temperature variations and power supply drifts, are compensated by variations on the detected predetermined signal fed back from the detector to the bandpass filter.

2. The heterodyne receiver according to claim 1, wherein the compensated value calculating means determines, based on the compared voltage value and the frequency passband of the bandpass filter, compensated voltage values to obtain the desired frequency passband wherein a plurality of the compensated voltage values are stored as a table.

3. The heterodyne receiver according to claim 1, wherein the compensated frequency passband control signal is composed of a signal compensated through a loop route feeding back the detected predetermined signal outputted from the detector.

4. The heterodyne receiver according to claim 1, wherein the compensating signal generating means is used in one of a straight-system, a superheterodyne-system and a direct conversion-system or homodyne system.

* * * * *

UNITED STATES PATENT AND TRADEMARK OFFICE
CERTIFICATE OF CORRECTION

PATENT NO.   :   5,781,851
DATED        :   July 14, 1998
INVENTOR(S)  :   Masahisa SAITO It is certified that error appears in the above-indentified patent and that said Letters Patent is hereby corrected as shown below:

Claim 2, Col. 6, line 32, after "passband", insert --,--.

Signed and Sealed this

Sixth Day of July, 1999

Attest:

Q. TODD DICKINSON

Attesting Officer

Acting Commissioner of Patents and Trademarks